United States Patent [19]

Vassallo et al.

[11] Patent Number: 4,834,430
[45] Date of Patent: May 30, 1989

[54] PIPE SOCKET INSERT

[75] Inventors: Efrain D. Vassallo; Jose E. Valls, both of Ponce, P.R.

[73] Assignee: Vassallo Research & Development Corp., Ponce, P.R.

[21] Appl. No.: 145,452

[22] Filed: Jan. 19, 1988

[51] Int. Cl.$^4$ ............................................. F16L 17/00
[52] U.S. Cl. .................................... 285/379; 285/423
[58] Field of Search ............... 285/379, 110, 374, 423, 285/108, 334.2, 334.3; 277/189, 207 A; 29/445, 451; 264/511, 516, 571, 296, 322, DIG. 50; 425/504, 388, 343, DIG. 218

[56] References Cited

U.S. PATENT DOCUMENTS

| | | | |
|---|---|---|---|
| 2,097,571 | 11/1937 | Moran | 277/207 A |
| 3,430,989 | 3/1969 | Wenct | 277/207 A |
| 4,120,521 | 10/1978 | Parmann | 285/423 X |
| 4,368,894 | 1/1983 | Parmann | 277/207 A |
| 4,625,383 | 12/1986 | Vassallo et al. | 425/DIG. 218 |

FOREIGN PATENT DOCUMENTS 6805559 10/1968 Netherlands ........................ 285/379

Primary Examiner—Dave W. Arola
Attorney, Agent, or Firm—Steele, Gould & Fried

[57] ABSTRACT

A pipe socket insert is disclosed for use within the socket of a length of plastic pipe. The insert is formed as a shaped annulus having a rearward, downwardly inclined ramp and a forward, downwardly inclined ramp, the rearward ramp and the forward ramp having a circular transition zone therebetween. The rearward ramp is provided with a plurality of circularly spaced valleys defined one from the other by circularly spaced ribs, the ribs forming portions of the outer peripheral configuration of the rearward ramp for contact with portions of the inner periphery of the pipe socket. Additionally, if desired, the forward ramp can also be provided with a plurality of circularly spaced valleys defined one from the other by a plurality of circularly spaced ribs.

15 Claims, 3 Drawing Sheets

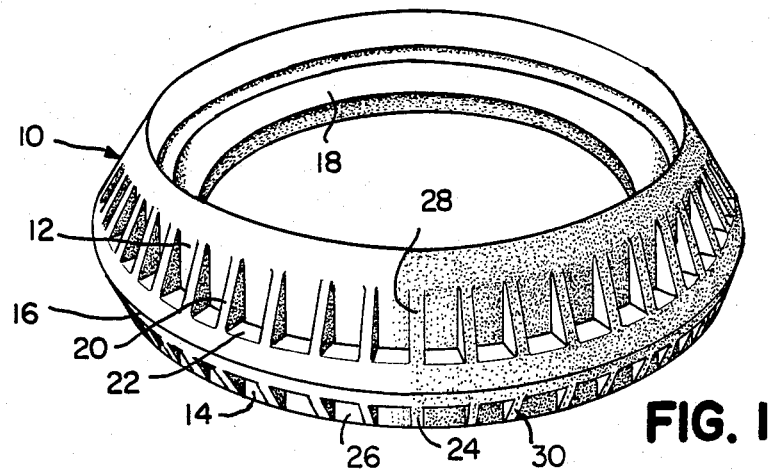
FIG. 1
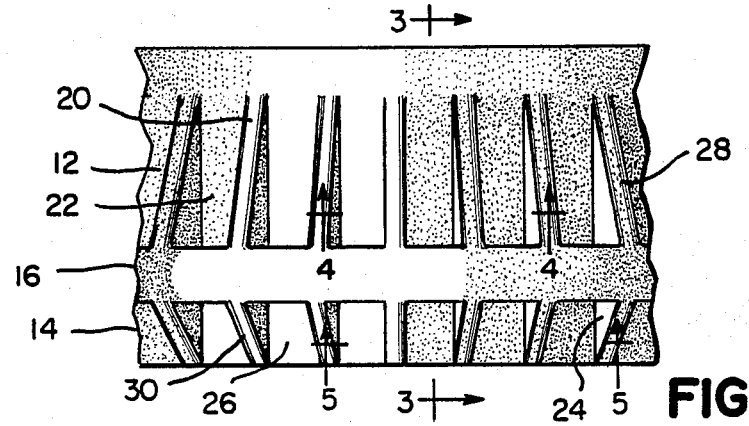
FIG. 2
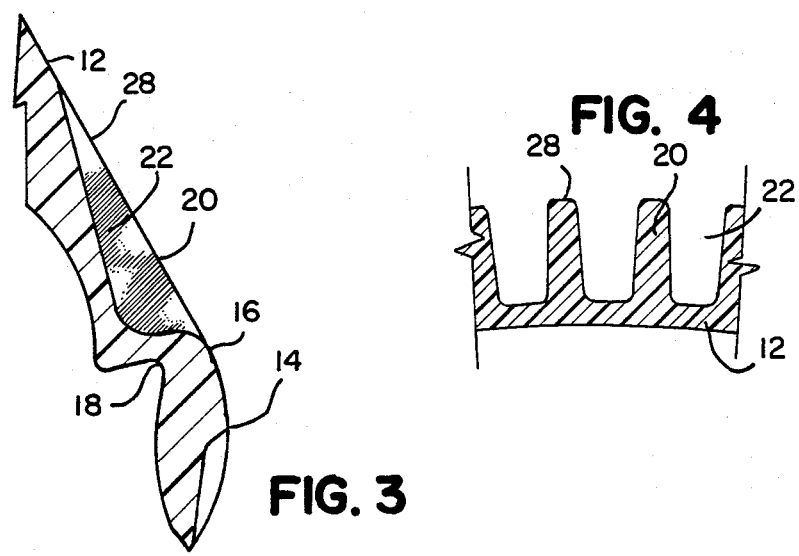
FIG. 3
FIG. 4

4,834,430

PIPE SOCKET INSERT

BACKGROUND OF THE INVENTION

1. Field of the Invention

The present invention relates generally to the field of plastic pipes, and more particularly, is directed to an improved extruded pipe socket molded insert suitable for being encapsulated within the bell or socket at one end of a length of plastic pipe during the pipe belling procedure to provide a precisely formed interior recess for seating a resilient gasket therewithin.

2. Description of the Prior Art

It has been the common practice in the plastic pipe industry to form an expanded bell or socket at one end of a length of plastic pipe to receive therein the unbelled end of the next adjacent length of plastic pipe. A resilient gasket of moisture impervious material was installed at each joint for sealing purposes. This provides a sturdy interconnection between adjacent lengths of pipe in a manner to provide structural integrity and to prevent leakage at each pipe joint when a piping system is made up in the field. More recently, in order to improve the leak resistant characteristics of the system, an internal groove has frequently been provided in the bell or socket configuration when the bell or socket shape was formed. The internal groove thus formed presents a convenient, annular recess for seating a resilient gasket therein in a manner to fascilitate the making up of leak proof junctions between adjacent lengths of pipe without unseating or otherwise disturbing the gasket during pipe line construction.

The proper seating of the gasket within the hub or spigot of a pipe can sometimes present field problems upon installation, especially in large diameter work. Particularly, in many large diameter pipe hub designs, the gaskets have been subject to displacement or "fishmouthing" when the joint was being formed in the field. In other instances, when the system was operated under pressure, there are many documented instances wherein the gasket would blow out in the event of pressure surges in the line, to thereby destroy the integrity of the piping system as such joints.

In order to increase the reliability of the piping systems and to assure improved gasket seating in large diameter plastic piping systems, a novel extruded pipe socket molded insert has previously been developed by the present applicants. The molded insert is disclosed in U.S. Pat. No. 4,625,383, entitled "Method for Seating a Gasket in a Plastic Pipe Bell Using a Hard Configured Ring", which patent is owned by the assignee of the present application. The molded insert or "EPSMI" ring disclosed in U.S. Pat. No. 4,625,383 is designed for application upon the belling mandrel just prior to belling and then the bell or socket in the pipe end is formed about the EPSMI ring. In this manner the ring itself is utilized to shape an annular groove in the bell and the ring or insert will become encapsulated within the bell during the bell or socket forming operation. Upon properly forming the bell or socket on the belling mandrel, the belled end of the pipe is removed from the mandrel with the EPSMI ring encapsulated therewithin to thereby provide a hard plastic, precisely formed seat. This precisely formed seat is designed and intended to subsequently receive a resilient gasket therein in a manner to obviate the field installation and operating problems that heretofore were generally encountered with the prior art internal groove and resilient gasket constructions, particularly in large diameter plastic piping systems.

While the EPSMI ring disclosed in U.S. Pat. No. 4,625,383 has proved to be of great benefit in the large diameter plastic piping industry, the large volume of relatively high cost plastic material, such as polypropylene plastic, required to form such rings has proved to be expensive in use. Both the high material cost and the relatively slowness in manufacture due to the considerable cooling period required in the mold because of the thickness of the ring section have combined to increase the plastic ring production costs. The present invention seeks to provide a pipe socket plastic ring insert construction which results in considerable material cost saving, which is capable of increased production speed and which provides better efficiency in fabrication during the bell forming procedures.

SUMMARY OF THE INVENTION

The present invention relates generally to the field of plastic pipe bells or sockets, and more particularly, is directed to an improved pipe socket insert suitable for encapsulating within the pipe socket which is formed in one end of a length of plastic pipe during the bell or socket forming procedure.

The pipe socket insert of the present invention comprises generally an annular hard plastic ring which can preferably be fabricated of polypropylene plastic or perhaps polyethylene plastic in known manner. The hard plastic ring can be formed to precise dimensional configurations to receive and seat therein a resilient gasket in a manner to prevent leakage and to discourage gasket displacement or blow out in plastic piping systems, particularly in large diameter plastic piping systems.

The improved pipe socket insert of the present invention is formed generally to the same outer configurations and dimensions as disclosed in U.S. Pat. No. 4,625,383. In known manner, the pipe socket insert of the present invention is configured as a shaped annulus and comprises generally a radially inwardly facing open junction to seat a resilient gasket therewithin. The pipe socket insert is radially outwardly formed to provide a forward, partial, radially outwardly inclined forward ramp and contiguous rearward, radially outwardly inclined rearward ramp. During the socket forming process, a heated end of a length of plastic pipe is urged over the belling mandrel upon which a novel pipe socket insert or shaped ring which forms the subject matter of the present invention had previously been positioned. The heated pipe end will ride upwardly over the rearward or trailing ramp of the pipe socket insert and then downwardly over the forward, radially outwardly inclined ramp in a manner to encapsulate the socket insert within the shaped socket or pipe bell during the bell forming procedures.

In order to reduce the cooling time of the pipe socket insert during the insert molding procedures and thereby increase production speed, it is a feature of the present invention to form a plurality of ribs and valleys circumferentially in either or both the forward ramp and/or the rearward ramp of the pipe socket insert. The valleys thereby formed reduce the material thickness of the ramps about their entire circumferential configurations. The pipe socket inserts are preferably formed by the molding process and the reduced thickness thus increases hardening speed to permit hardening of the plastic material in a minimum amount of time. The lessor cooling period required to produce each pipe socket insert is a direct result both of the reduced heat sink effect resulting from the thinner plastic material sections utilized and the increased area of cooling surface available due to the increased surface area provided by the rib and valley configurations.

In addition to providing increased rates of production due to the decreased required cooling time, the introduction of the rib and valley design configuration results directly in considerable material saving costs. Further, inasmuch as the preheated plastic pipe end must be forced directly over the forward and rearward ramps of the pipe socket insert during the pipe belling process, the frictional drag of the pipe end interior periphery upon the surface of the insert will be reduced. Only the tops of the ribs will be contacted by the interior periphery of the pipe end and there will be no frictional engagement whatsoever between the pipe socket insert and the interior periphery of the pipe end at the valley areas of the forward and rearward ramps.

It is therefore an object of the present invention to provide a novel pipe socket insert of the type set forth.

It is another object of the present invention to provide an improved pipe socket insert having reduced cross sectional material thickness.

It is another object of the present invention to provide an improved pipe socket insert having means provided therein to reduce the required cooling period following the molding operation in a manner to enhance the rate of production.

It is another object of the present invention to provide an improved pipe socket insert of the type comprising a radially inwardly open gasket seat, a radially outwardly facing forward ramp and a radially outwardly facing rearward ramp wherein at least either of the forward ramp or the rearward ramp is provided with a plurality of circularly spaced ribs and valleys.

It is another object of the present invention to provide an improved pipe socket insert of the type comprising a radially inwardly open gasket seat, a radially outwardly facing forward ramp and a radially outwardly facing rearward ramp wherein both of the ramps are provided with a plurality of circularly spaced ribs and valleys.

It is another object of the present invention to provide a novel pipe socket insert that is relatively speedy in manufacture, inexpensive in fabrication and trouble free when in use.

Other objects and a fuller understanding of the invention will be had by referring to the following description and claims of a preferred emodiment thereof, taken in conjunction with the accompanying drawings, wherein like reference characters refer to similar parts throughout the several views and in which:

BRIEF DESCRIPTION OF THE DRAWINGS

FIG. 1 is a perspective view showing a molded plastic pipe socket insert in accordance with the present invention.

FIG. 2 is an enlarged, partial, elevational view of the molded socket insert of FIG. 1.

FIG. 3 is an enlarged cross sectional view taken along line 3—3 on FIG. 2, looking in the direction of the arrows.

FIG. 4 is an enlarged cross sectional view taken along line 4—4 on FIG. 2, looking in the direction of the arrows.

DESCRIPTION OF THE PREFERRED EMBODIMENT OF THE INVENTION

Figure 5:
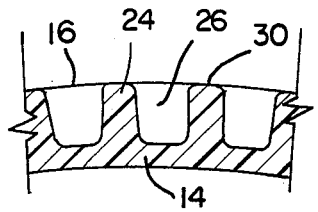
FIG. 5 is an enlarged cross sectional view taken along line 5—5 on FIG. 2 looking in the direction of the arrows.
Figure 6:
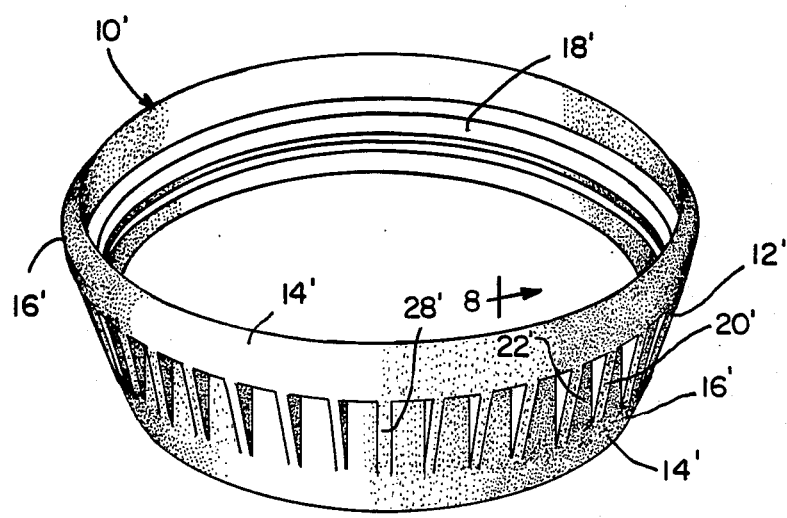
FIG. 6 is a perspective view of a modified embodiment of the pipe socket insert.
Figure 8:
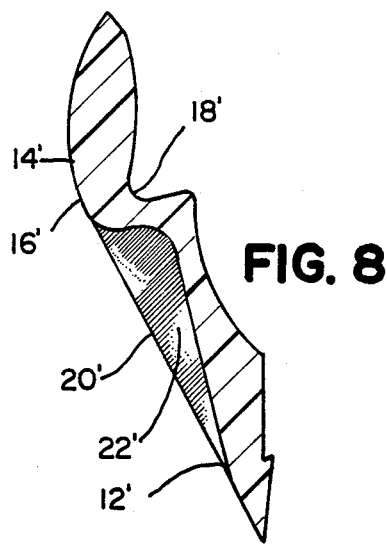
FIG. 8 is an enlarged cross sectional view taken along line 8—8 on FIG. 7, looking in the direction of the arrows.
Figure 9:
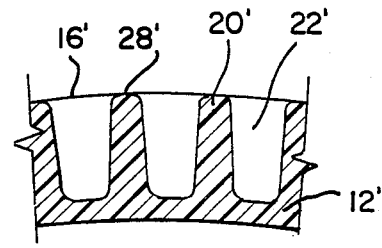
FIG. 9 is an enlarged cross sectional view taken along line 9—9 on FIG. 6, looking in the direction of the arrows.

Although specific terms are used in the following description for the sake of clarity, these terms are intended to refer only to the particular structure of the invention selected for illustration in the drawings, and are not intended to define or limit the scope of the invention.

Referring now to the drawings, there is shown in FIGS. 1-5 and 10 a plastic pipe socket insert 10 which preferably can be formed of a hard, moldable plastic, for example, polypropylene plastic in the configuration of a shaped annulus. As set forth in said U.S. Pat. No. 4,625,383, the plastic insert 10 is intended to first be applied to a belling mandrel (not shown) whereby the pipe socket insert will be encapsulated within the bell or socket 34 of a length of plastic pipe 36 after the bell or socket has been formed on the belling mandrel. On the mandrel, the rearward ramp or radially outwardly inclined leg 12 of the molded insert 10 faces toward the end of the pipe to be belled and the joined, forward ramp or radially outwardly inclined leg 14 faces away from the end of the pipe to be belled. During the belling operation, a previously heated and softened end of a length of plastic pipe 36 is introduced to the mandrel and is forced to ride upwardly over the rearward ramp 12 and downwardly over the forward ramp 14 of the plastic insert 10. The belled end 34 of the plastic pipe 36 subsequently hardens in known manner and can then be removed from the belling mandrel with the plastic insert retained within the socket or pipe bell. Upon completion of the belling operation, the forward ramp 14 faces toward the forward end of the pipe and the rearward ramp 12 faces toward the rearward end of the length of pipe 36.

Still referring to FIGS. 1-5, it will be observed that the rearward ramp or rearward leg 12 is molded or otherwise formed to provide a plurality of circularly spaced valleys 22, which valleys are indented about the entire outer periphery of the plastic insert 10. The valleys 22 are defined one from the other by a plurality of circularly spaced ribs. The outer surfaces 28 of the ribs 20 define the outer periphery of the rearward ramp 12 to thereby provide a plurality of spaced, inclined surfaces which are positioned to be contacted by the heated end of the pipe during the pipe belling operation. As shown, the width of the valleys 22 is preferably about twice the width of the ribs 20.

Similarly, if desired, the forward ramp 14 can also be provided with a plurality of circularly spaced, forward valleys 26, which valleys are defined one from the other by a plurality of similar, circularly spaced, forward ribs 24. As shown, the width of the valleys 26 is preferably about twice the width of the forward ribs 24. The outer surfaces 30 of the insert forward ramp ribs 24 form the outer periphery of the forward ramp 14 and these ribs are contacted by the softened end of the plastic pipe during the pipe belling operation. As shown, the rearward ramp ribs 20 and the forward ramp ribs 24 are preferably formed of triangular configuration.

A transition zone 16 is formed intermediate the rearward ramp 12 and the forward ramp 14. The transition zone 16 smoothly projects radially outwardly beyond the rearward and forward ramps 12, 14 to provide the maximum diameter of the plastic insert. The transition zone 16 is preferably fabricated of smooth, gently rounded curves to fascilitate passage of the softened end (not shown) of the plastic pipe 36 as the plastic pipe is urged over the mandrel (also not shown) during the pipe belling operation.

Referring now to FIGS. 6, 7, 8 and 9, a modified embodiment 10' of the plastic socket insert is illustrated, which embodiment is similar in concept and in construction to the plastic socket insert 10. As can be seen in the drawings, in this modified embodiment 10', only the rearward ramp 12' is molded or otherwise formed to provide a plurality of circularly spaced valleys 22' and intermediate, circularly spaced ribs 20'. In all other respects, the modified plastic insert 10' of FIGS. 6-9 is essentially similar in construction to the plastic insert 10. Accordingly, similar elements are designated with similar numerals with the exception that a prime "'" has been utilized in conjunction with each component numeral.

The mold utilized to form the plastic inserts 10, 10' may be provided with a plurality of steel counterparts (not shown) to thereby conveniently form the valleys 22, 22', 26 and to define the intermediate ribs 10, 10', 24. Since the plastic insert or ring 10, 10' will then be of thinner section at the valley areas 22, 22', 26 due to the removal of plastic material at the valleys, and because the steel in the mold is normally cooled during the cooling cycle of plastic insert molding process, the plastic pipe socket inserts 10, 10' of the present invention can be produced faster due to the enhanced efficiency of the insert manufacturing process.

As above set forth, and as more fully explained in U.S. Pat. No. 4,625,383, the heated plastic pipe end is forced over the forward and rearward insert ramps 14, 12 during the belling process. Since there will be less area of contact between the inner peripheral surface of the heated plastic pipe and the outer surfaces 28, 28', 30 of the plastic socket inserts 10, 10' due to the presence of the valleys 22, 22', 26, friction between the respective parts as the pipe end is introduced over the belling mandrel (not shown) will accordingly be significantly decreased. In view of the reduction in friction at the areas of mutual contact between the plastic inserts 10, 10' and the interior preiphery of the heated end of the pipe 36 during the belling process, the pipe will slide more easily over the insert 10, 10' to additionally increase manufacturing efficiencies.

Figure 10:
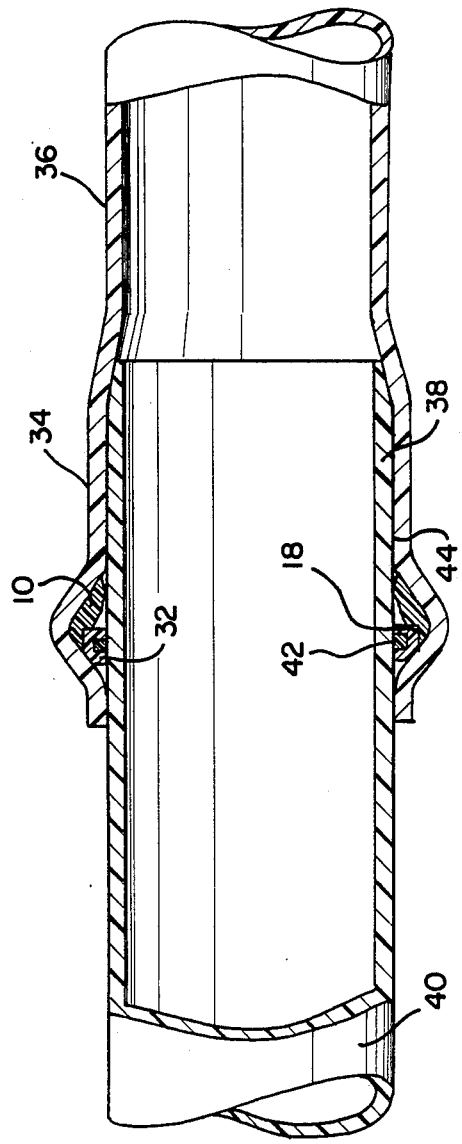
FIG. 10 is a side elevational view, partly cut away, showing the pipe socket insert in use.
Figure 7:
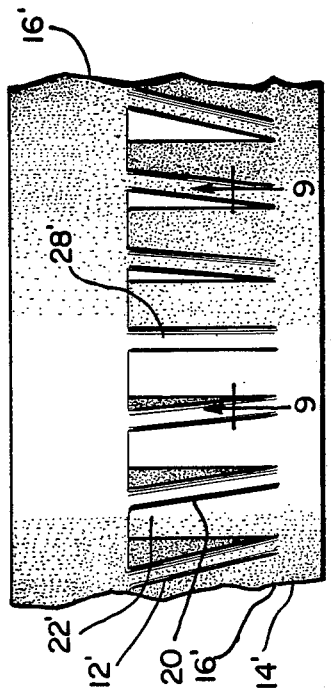
FIG. 7 is a partial, enlarged side elevational view of the pipe socket insert of FIG. 6.

As best seen in FIG. 10, a suitable, resilient, circular gasket 32 of known construction and configuration can be readily inserted into the inwardly facing seat 18, 18' of the insert 10, 10' after the bell or socket 34 is formed in one end of a length of plastic pipe 36 with the insert 10, 10' encapsulated therein. The spigot end 38 of the next adjacent length of plastic pipe 40 inserts into the pipe bell 34 and forms a sealed, leak-proof joint therebetween due to the continuous sealing action of the gasket 32 against the outer periphery 44 of the spigot end 38. Preferably, a hard plastic ring 42 is employed in conjunction with the resilient gasket 32 in known manner to increase the reliability of the gasket sealing action.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. A pipe socket insert of the type comprising an inwardly facing seat to receive a resilient gasket therein for seating the resilient gasket in the socket of a length of plastic pipe comprising:
   a shaped annulus, the annulus comprising a radially inwardly facing surface and a radially outwardly facing surface, the said inwardly facing surface and said outwardly facing surface defining a circular insert body therebetween;
   the outwardly facing surface of the body comprising an axially rearward inclined ramp and an axially forward inclined ramp, the rearward ramp being defined from the forward ramp by a smooth transition zone,
   the rearward ramp and the forward ramp each comprising an outer periphery; and
   a plurality of rearward valleys formed in the said rearward inclined ramp, the valleys reducing the thickness of the body in spaced locations about the rearward ramp.

2. The pipe socket insert of claim 1 wherein the rearward valleys are circumferentially spaced about the rearward inclined ramp.

3. The pipe socket insert of claim 2 wherein the rearward valleys are respectively defined one from the other by a plurality of circumferentially spaced rearward ribs, each rearward valley having a width equal to the spacing between adjacent ribs and each rib having a circumferential thickness.

4. The pipe socket insert of claim 3 wherein the rearward ribs terminate radially outwardly in outer surfaces, the said outer surfaces forming portions of the outer periphery of the rearward inclined ramp.

5. The pipe socket insert of claim 3 wherein the width of the said rearward valleys is greater than the circumferential thickness of the said rearward ribs.

6. The pipe socket insert of claim 5 wherein the width of the rearward valleys is approximately twice the circumferential thickness of the rearward ribs.

7. The pipe socket insert of claim 1 wherein the forward inclined ramp is provided with a plurality of forward valleys.

8. The pipe socket insert of claim 7 wherein the forward valleys are circumferentially spaced about said forward inclined ramp.

9. The pipe socket insert of claim 8 wherein the forward valleys are respectively defined one from the other by a plurality of circumferentially spaced forward ribs, the ribs having the same thickness.

10. The pipe socket insert of claim 9 wherein the forward ribs terminate radially outwardly in outer surfaces, the said outer surfaces forming portions of the outer periphery of the said forward inclined ramp.

11. The pipe socket insert of claim 9 wherein the forward ribs are triangular in cross sectional configuration.

12. The pipe socket insert of claim 11 wherein the rearward valleys are respectively defined one from the other by a plurality of circularly spaced, rearward ribs.

13. The pipe socket insert of claim 10 wherein the rearward ribs are generally triangular in cross sectional configuration.

14. The pipe socket insert of claim 9 wherein the distance between said forward ribs is greater than the circumferential thickness of the said forward ribs.

15. The pipe socket insert of claim 14 wherein the distance between said forward ribs is approximately twice the circumferential thickness of the forward ribs.

* * * * *